United States Patent [19]

Erickson et al.

[11] Patent Number: 4,868,401

[45] Date of Patent: Sep. 19, 1989

[54] METHOD AND MEANS FOR MEASURING DISTANCE OF A MOVING OBJECT FROM A FIXED POINT OF REFERENCE

[76] Inventors: Ronnie D. Erickson, 217 15th St.; Mark J. Nelson, R.R. 4, both of Ames, Iowa 50010

[21] Appl. No.: 252,607

[22] Filed: Oct. 3, 1988

[51] Int. Cl.4 .............................................. G01B 11/00

[52] U.S. Cl. .................................... 250/548; 250/561; 330/59; 356/372; 381/96

[58] Field of Search .................. 250/548, 561; 330/59, 330/308; 356/4, 373, 375; 381/59, 96

[56] References Cited

U.S. PATENT DOCUMENTS

| | | | |
|---|---|---|---|
| 3,994,589 | 11/1976 | Nodwell et al. | 356/156 |
| 4,207,430 | 6/1980 | Harada et al. | 381/59 |
| 4,325,638 | 4/1982 | Takeda et al. | 356/375 |
| 4,484,069 | 11/1984 | Brenholdt | 356/4 X |
| 4,585,349 | 4/1986 | Gross et al. | 356/375 |
| 4,698,511 | 10/1987 | Sueda et al. | 250/560 |
| 4,708,483 | 11/1987 | Lorenz | 356/376 |
| 4,731,744 | 3/1988 | Harrell et al. | 364/560 |

FOREIGN PATENT DOCUMENTS

| | | | |
|---|---|---|---|
| 2641079 | 3/1978 | Fed. Rep. of Germany | 381/59 |
| 2853676 | 6/1980 | Fed. Rep. of Germany | 381/96 |

*Primary Examiner*—Steven Mottola
*Attorney, Agent, or Firm*—Zarley, McKee, Thomte, Voorhees & Sease

[57] ABSTRACT

The present invention utilizes a light source mounted on a moving object and providing a light having a constant intensity. A detector circuit creates an electrical detector signal in response to receiving light from a predetermined fixed point of reference. The detector signal is then linearized by a linearization circuit which transforms the detector signal which is substantially nonlinear to a linearization signal which is substantially linear. The linearization signal can then be used in a feedback circuit for causing movement of the moving object, and can be used to precisely control the movement of the moving object.

9 Claims, 3 Drawing Sheets

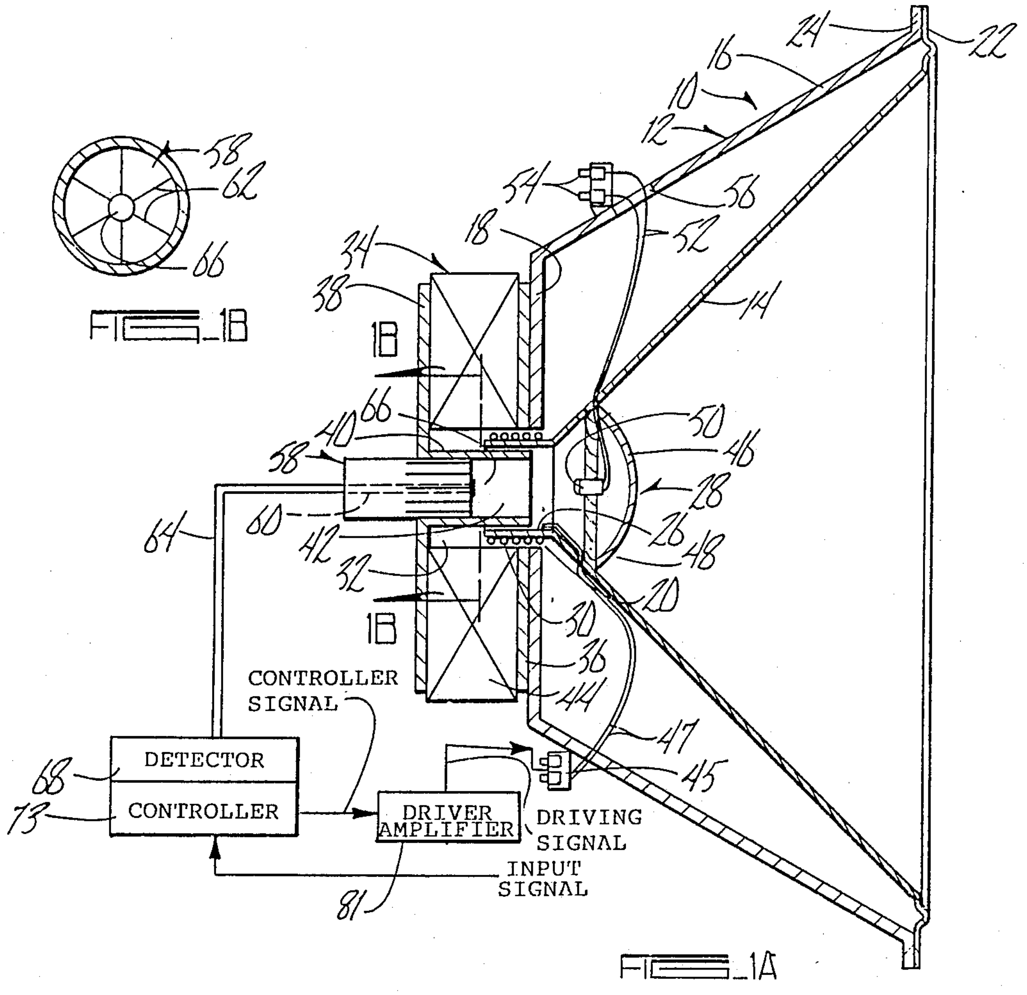
FIG. 1B
FIG. 1A
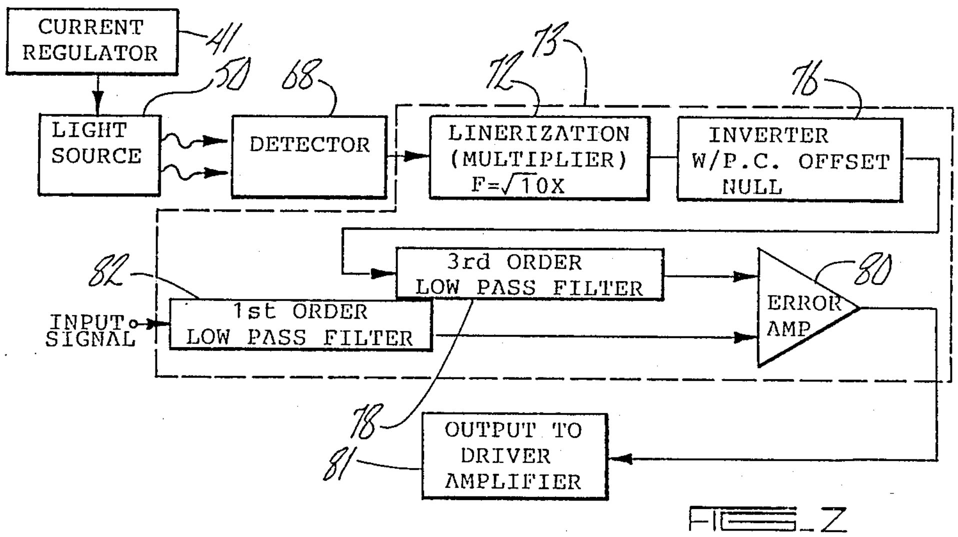
FIG. 2

METHOD AND MEANS FOR MEASURING DISTANCE OF A MOVING OBJECT FROM A FIXED POINT OF REFERENCE

BACKGROUND OF THE INVENTION

This invention relates to a method and means for measuring distance of a moving object from a fixed point of reference.

Various attempts have been made to determine the distance of a moving object from a point of reference, utilizing the principle that when light emanates from a point source, the illuminance of a surface on which the light is shown varies inversely with the square of the distance from the source. When the surface is perpendicular to the light beam, this relationship can be defined by the following equation:

$$E=I/s^2$$

Where "E" is the illuminance at the receiving surface, "I" is the luminous intensity of the light source, and "s" is the distance between the light source and the surface receiving the light. If the light source has a constant light intensity, then "I" becomes a constant, and the above equation produces an exponential curve when "E" and "s" are variable.

One prior art patent, U.S. Pat. No. 4,207,430, shows an attempt to sense the distance of a moving object by placing a light source on the moving object, and by receiving the light at a fixed point. In this prior art reference, the light source is placed upon the diaphragm of the speaker, and the receiver for the light source is placed at a fixed point of reference on the speaker.

A problem recognized by the inventor in U.S. Pat. No. 4,207,430 is the difficulty in utilizing a signal which behaves in a nonlinear fashion. Accordingly, the invention disclosed in U.S. Pat. No. 4,207,430 utilizes an optical guide means between the light source and the light receiver. The optical guide means causes the light intensity to vary with respect to the distance in a linear fashion, rather than in the normal exponential fashion, which would result if no obstructions were placed between the light source and the light detector.

One disadvantage of this prior art device is that it can maintain linearity in only a limited range of movement of the diaphragm. The linearity is only present in a range of a few millimeters (approximately 0.4 inch) whereas many speakers move a distance as great as one inch or more. The prior art device does not maintain linearity throughout this greater range of movement.

Therefore, a primary object of the present invention is the provision of an improved method and means for measuring distance of a moving object from a fixed point of reference.

A further object of the present invention is the provision of an improved method and means for measuring distance of a moving object which does not require an optical guide means or other light obstruction between the light source and the detector of the light source.

A further object of the present invention is the provision of an improved method and means for measuring the distance of a moving object, wherein an electrical detector circuit and an electrical linearization circuit are utilized for converting the light signal received from the moving object into a substantially linear electrical signal.

A further object of the present invention is the provision of a device which produces a feedback signal which remains substantially linear throughout an increased range of movement of the moving object.

A further object of the present invention is the provision of an improved method and means for measuring distance of a moving object from a fixed point of reference, which can be used in numerous applications, including the feedback systems for electrical speaker systems as well as other applications.

A further object of the present invention is the provision of an improved method and means which are economical to manufacture, durable to use, and efficient in operation.

SUMMARY OF THE INVENTION

The present invention utilizes a light source which is affixed to the moving object such as the vibrating diaphragm of an electrically-driven speaker. A light-receiving element is placed at a fixed point of reference. The light received by the light-receiving element is conveyed through a light conduit such as an optical fiber cable to a detector circuit located remotely from the light-receiving element. The detector includes electrical circuitry for sensing the light intensity emanating from the optic fiber and for converting that light intensity into an electrical signal which corresponds directly in amplitude to the intensity of the light signal transmitted through the conduit.

The electrical detector signal emanating from the detector is then passed through a linearization circuit which transforms the detector signal into a linearization signal, which has an amplitude varying in a substantially linear fashion with respect to the distance of the moving object from the point of reference.

This linearization signal can be used in a number of applications, and one example of such an application is in the use of a feedback system for an electrically-driven speaker. In this application, an input signal is fed into a controller which sends a controller signal to the driver amplifier which in turn sends a driving signal to the speaker. The movement of the speaker is converted into a linearization signal in the manner described above, and the linearization signal is fed back into the controller. The controller then compares the input signal to the linearization signal and adjusts the controller signal until the linearization signal (caused by the actual movement of the speaker) is substantially equal to the input signal.

The space between the light source and the light receiver is unobstructed and does not include an optical guide means for altering the light signal emanating from the light source.

BRIEF DESCRIPTION OF THE DRAWINGS

FIG. 1A is a sectional view of a speaker showing the detector, controller, and driver in block diagram.

FIG. 1B is a sectional view taken along line 1B—1B.

FIG. 3 is an electrical schematic diagram of the circuitry of the present invention.

DESCRIPTION OF THE PREFERRED EMBODIMENT

Figure 2:
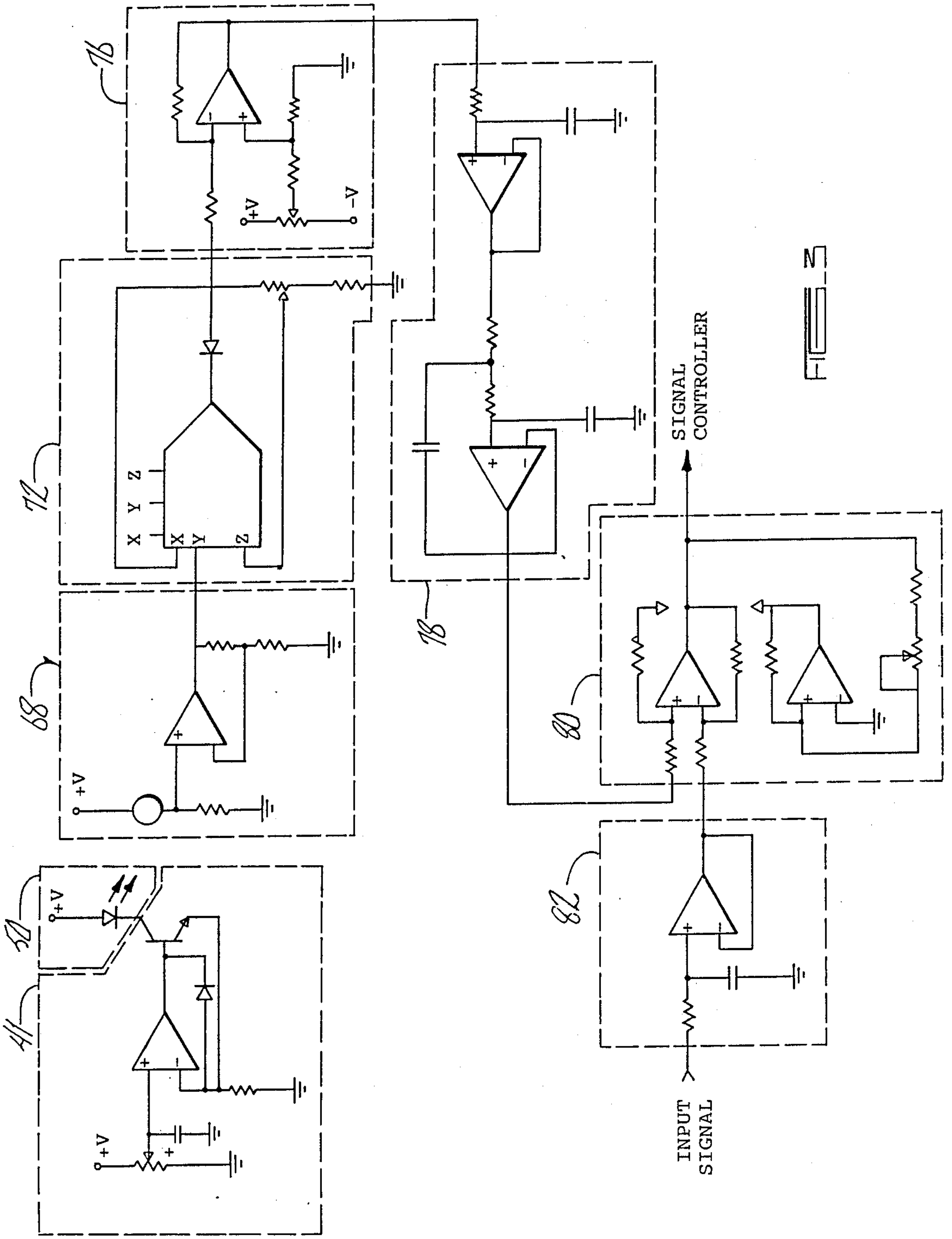
FIG. 2 is a block diagram of the present invention.

Referring to the drawings, the numeral 10 generally designates an electrically-driven bass speaker which utilizes the present invention. Speaker 10 comprises an outer frame 12, and a cone-shaped diaphragm 14. Outer frame 12 includes a conical portion 16 and a back plate portion 18, which is provided with a central opening 20.

Diaphragm 14 is cone shaped with its outer end 22 connected to the rigid outer end 24 of frame 12. The central portion of diaphragm 14 is connected to a coil former 26 and to a centrally-located dust cap 28 which covers the coil former 26. The coil former 26 is provided with a loudspeaker coil 30, which is located in the central opening 32 of a magnet system 34. Magnet system 34 includes a front plate 36 and a rear plate 38 to which is attached a soft iron core 40, which protrudes within the coil former 26, and which includes a cylindrical bore 42 extending there through. An annular-shaped, permanent magnet 44 is positioned between front plate 36 and rear plate 38 and forms the central opening 32 in which coil former 26 is inserted. A connection 45 is attached to frame 12 and includes lead wires 47 extending t and connected to coil 30 for driving coil 30.

By delivering a driving signal to the coil 30, it is possible to cause the diaphragm 14 to move in accordance with a predetermined pattern. This movement results from the electromagnetic field within central opening 32, which causes oscillating inward and outward movement of the coil former 26 within opening 32, and corresponding movement of the diaphragm 14.

Dust cap 28 comprises a circular felt portion 46 having a convex surface presented outwardly. Attached to the rearward side of felt portion 46 is a circular disc 48 having a light emitting diode 50 mounted at its center and facing rearwardly into the cylindrical bore 42 of soft iron core 40. A pair of electrical wires 52 are connected to a terminal 54 on the exterior of outer frame 12. Wires 52 extend through an opening 56 in frame 12 and extend through cone-shaped diaphragm 14. The lower ends of wires 52 extend between the felt portion 46 and the disc 48 where they are connected to light emitting diode 50. When light emitting diode 50 is actuated, it directs light into the cylindrical bore 42 of soft iron core 40. A current regulator circuit 41 (FIGS. 2 and 3) is connected to light emitting diode 50 causing it to emit a light of constant intensity.

Frictionally fitted within bore 42 is a cylindrical block 58, which has a central bore 60 extending there through. The forward end of cylindrical block 58 includes a plurality of radial slots 62 (FIG. 1B) which permit the cylindrical block 58 to be press fitted within bore 42 of soft iron core 40. An optical fiber cable 64 extends through bore 60 of block 58 and terminates at a forward light-receiving end 66. The compression of the cylindrical block 58 within bore 42 causes the block 58 to be pressed tightly against the light-receiving end 66 of cable 64 so as to hold it in place. Cable 64 extends from block 58 to a detector circuit 68. Detector 68 is an integrated circuit utilizing photodiodes and a current source for transforming a light signal into an electrical detector signal which corresponds directly in amplitude with the amplitude of the light signal received from optic fiber cable 64.

In operation of the device, the light emitting diode 50 is actuated so as to emanate light therefrom at a constant light intensity. The light receiving end 66 of cable 64 receives the light from diode 50 and carries that light signal to the detector 68, which in turn converts the light signal received at light-receiving end 66 into an electrical detector signal having a direct corresponding relation in amplitude to the light signal being carried by cable 64.

Figure 4:
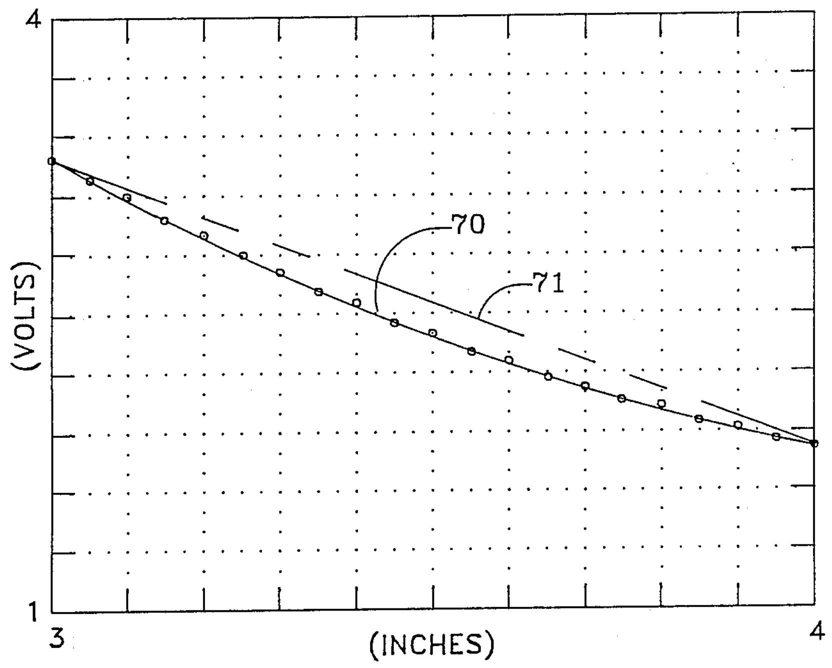
FIG. 4 is a graph showing the curve represented by the detector signal of the present invention in relation to the distance of the light source from the light receiver.

Referring to FIG. 4, the detector signal is represented by the curve 70. The X-axis represents the distance of the receiver 66 from the light source 50, and the Y-axis represents the amplitude of the voltage of the resulting detector signal. The curve 70 is nonlinear, and its comparison to a linear curve can be seen by comparing the curve 70 to straight line 71 shown in FIG. 4. The curve 70 represents a segment of an exponential curve produced by the formula $E=I/s^2$, where "I" is a constant, "E" is the light intensity received at light-receiving end 66, and "s" is the distance between light-receiving end 66 and the light emitting diode 50.

In order to utilize the detector signal for providing curative feedback to the driving system for the speaker, it is preferable to modify the curve 70 so that it more closely approximates a linear curve such as the line 71. In order to linearize the curve 70, the detector signal is introduced to a controller circuit 73 which is comprised of a linearization circuit 72, an inverter circuit 76, a third order low pass filter circuit 78, an error amplifier 80, and a first order low pass filter 82 (FIGS. 2 and 3). An example of a linearization circuit 72, which is preferred for the present invention, is manufactured by General Electric Company under the trademark "INTERSIL", Model No. ICL8013. The ICL8013 model is a four quadrant, analog multiplier capable of providing level shifting, division, and square root functions. In the present invention, the linearization circuitry is used to modify the detector signal by multiplying the detector signal by 10 and by next taking the square root of the product. Thus the output linearization signal produced by the linearization circuit 72 is represented by the following formula:

$$\text{Linearization Signal} = (10\ \text{Detector Signal})^{1/2}$$

Figure 5:
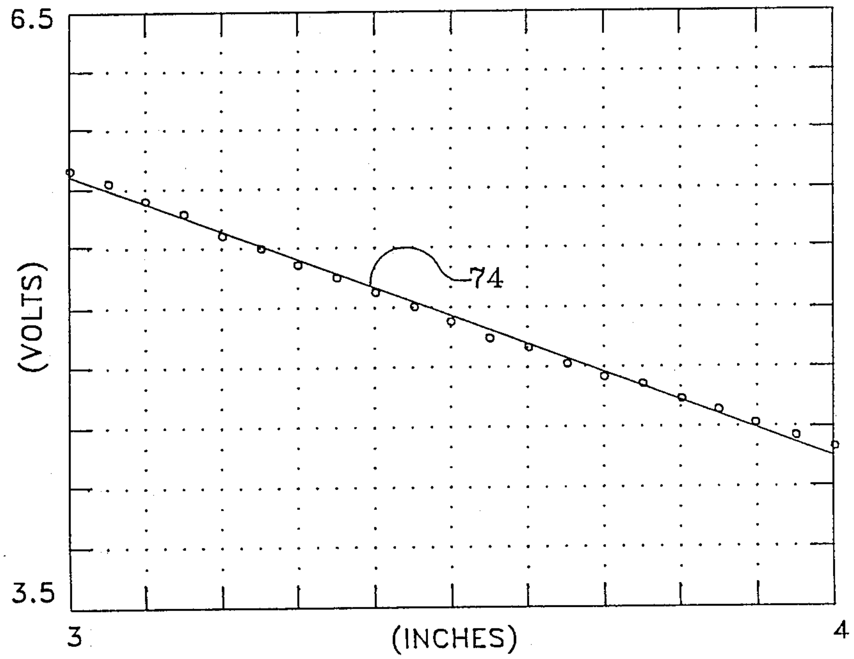
FIG. 5 is a graph similar to FIG. 4 showing the linearization signal in relation to the distance of the light source from the light-receiving element.

FIG. 5 illustrates a curve 74 which represents the linearization signal produced from detector signal 70. As can be seen, the curve 74 more closely approximates a straight line, and, therefore, is approximately linear for the displacements of approximately one inch as shown in the graphs of FIGS. 4 and 5. With the present invention it is possible to maintain linearity for much larger displacements than in prior devices, including displacements as great as two inches or more. The linearization signal coming from linearization circuit 72 is then passed through an inverter circuit 76 and a third order, low pass filter circuit 78 to an error amplifier circuit 80. Amplifier circuit 80 is also adapted to receive an input signal from an electronic crossover (not shown) which has been passed through a first order, low pass filter circuit 82. The error amplifier circuit 80 is a differential circuit which compares the linearization signal from the linearization circuit to the input signal coming from the electronic crossover. The error amplifier 80 then produces a controller signal which is directed to a driver amplifier 81. Driver amplifier 81 sends a driving signal to loudspeaker coil 30 for driving the cone-shaped diaphragm 14. The error amplifier 80 compares the linearization signal to the input signal, and adjusts the amplitude of the controller signal until the linearization signal and the input signal are equal.

As can be seen, the linearization signal is directly affected in a linear manner by movement of the light emitting diode 50, and, therefore, it is possible to cause the light emitting diode 50, and the cone 14 to be driven in a manner which corresponds substantially to the pattern required by the input signal. If the physical movement of the cone 14 differs from the pattern required by the input signal, this difference in movement is sensed, and the error amplifier 80 adjusts the controller signal so that the movement of the cone 14 does in fact correspond to the pattern required by the input signal.

The present invention is simple, and while its application is shown to an electrically-driven speaker system, the present invention can also be utilized in other applications. By linearizing the signal created by the change in light intensity, it is possible to provide a feedback system to permit the precise control of movement of any object with respect to a point of reference. Thus it can be seen that the device accomplishes at least all of its stated objectives.

What is claimed is:

1. A device for detecting the distance of a moving object from a predetermined fixed point of reference, said device comprising:

a light source attached to and carried by said moving object, said light source providing a light having constant intensity;

detector means adapted to receive light from said light source, said detector means being capable of creating an electrical detector signal having an amplitude directly corresponding to the level of intensity of light received by said detector means from said light source;

linearization circuit means connected to said detector means for receiving said detector signal and for altering said detector signal including, but not limited to, taking the square root of the amplitude of said detector signal, to create an electrical linearization signal which varies with respect to the distance of said light source from said point of reference according to a function which is more linear than the functional relationship of said amplitude of said detector signal with respect to said distance of said light source from said point of reference.

2. A device according to claim 1 comprising an elongated light conduit means having a first end positioned at said predetermined fixed point for receiving light from said light source, and having a second end remotely positioned relative to said first end and connected to said detector means, said light conduit means being capable of carrying light received by said first end thereof to said second end thereof and thence to said detector means.

3. A device according to claim 2 wherein said light conduit means comprises an optical fiber cable.

4. A device according to claim 3 wherein the space between said light source and said point of reference is free from light obstructing and light altering objects whereby light is free to pass unobstructed from said light source to said first end of said conduit means.

5. A device according to claim 1 wherein said moving object comprises a diaphragm of a loudspeaker.

6. A device according to claim 5 and further comprising a speaker coil for driving said diaphragm; error amplifier means connected to said linearization circuit means and being capable of producing a control signal, driver amplifier means connected to said error amplifier means and to said speaker coil for causing said speaker to be driven in response to said control signal, signal carrying means connected to said error amplifier means and carrying an input signal for driving said speaker diagram in a predetermined pattern of movement; said error amplifier means being capable of comparing said input signal to said linearization signal and of adjusting said control signal so that said linearization signal and said input signal are the same.

7. A method for detecting the distance of a moving object from a predetermined fixed point of reference; said method comprising:

attaching a light source of constant light intensity to said moving object for movement in unison therewith;

using a detector circuit means to detect the intensity of said light signal at said fixed point of reference and to create an electrical detector signal having an amplitude corresponding directly to the intensity of said light signal detected at said fixed point of reference;

using a linearization circuit means to receive and modify said detector signal to create a linearization signal having an amplitude characteristic which varies with respect to the distance of said moving object according to a function which is approximately linear;

modifying said detector signal with said linearization means by taking the square root of the amplitude of said detector signal.

8. A method according to claim 7 comprising attaching said light source to the moving diaphragm of an electrodynamic speaker, and connecting a light receiving end of a light conduit means to a stationary portion of said speaker, and using said light conduit means to carry light from said fixed point of reference to said detector means.

9. A method according to claim 7 introducing an input signal to an error amplifier which is connected to said linearization circuit for receiving said linearization signal therefrom; sending a control signal from said error amplifier to a driver amplifier; using said driver amplifier to drive said moving diaphragm of said speaker in response to said control signal; using said error amplifier to compare said linearization signal to said input signal and to adjust said controller signal so that said linearization signal and said input signal are the same.

* * * * *